March 10, 1942.  W. SPEARS  2,276,111
CARD IDENTIFYING AND ISSUING MACHINE
Filed Jan. 28, 1939  6 Sheets-Sheet 1
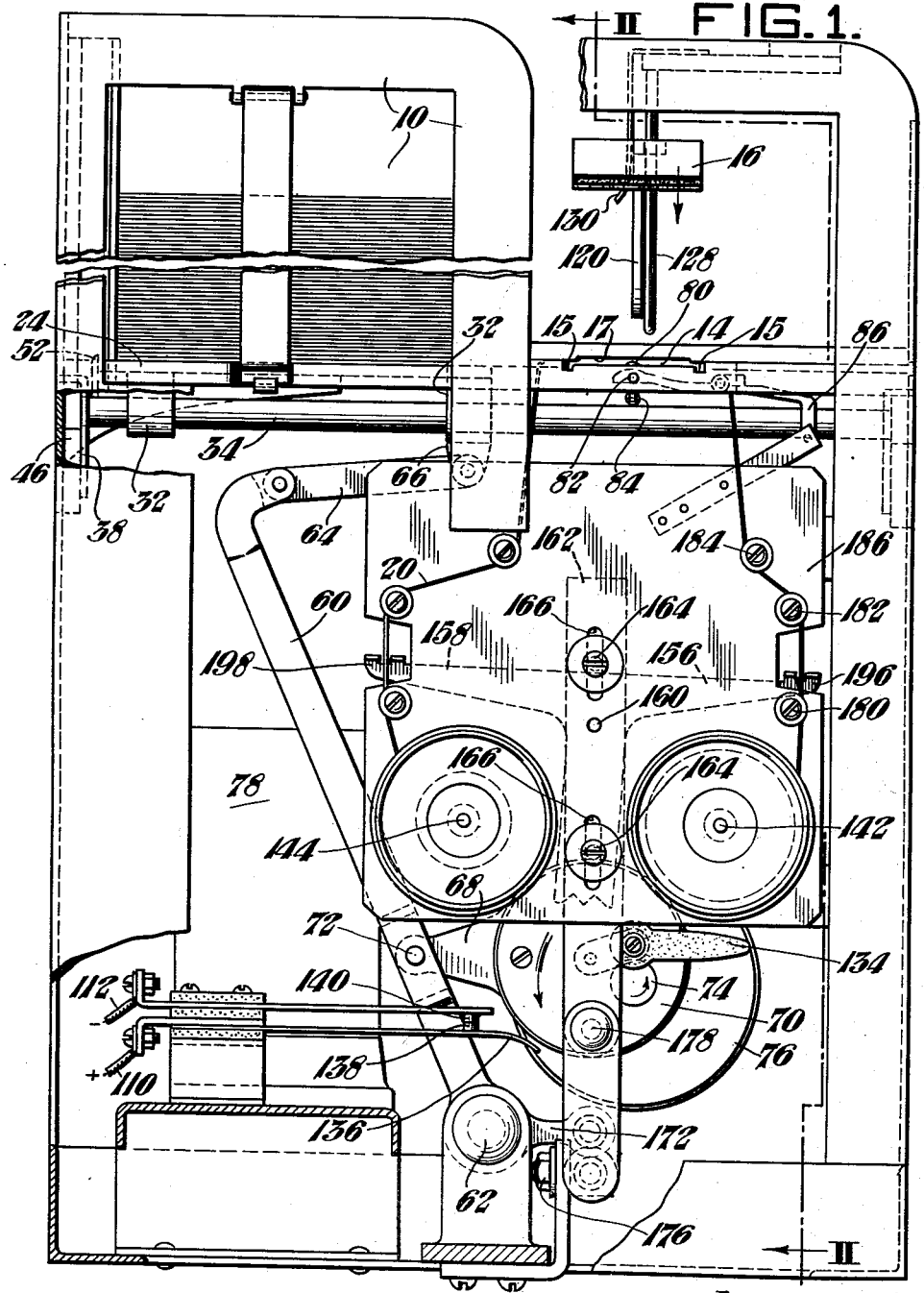
Inventor:
WILLIAM SPEARS,
by: John E. Jackson
his Attorney.

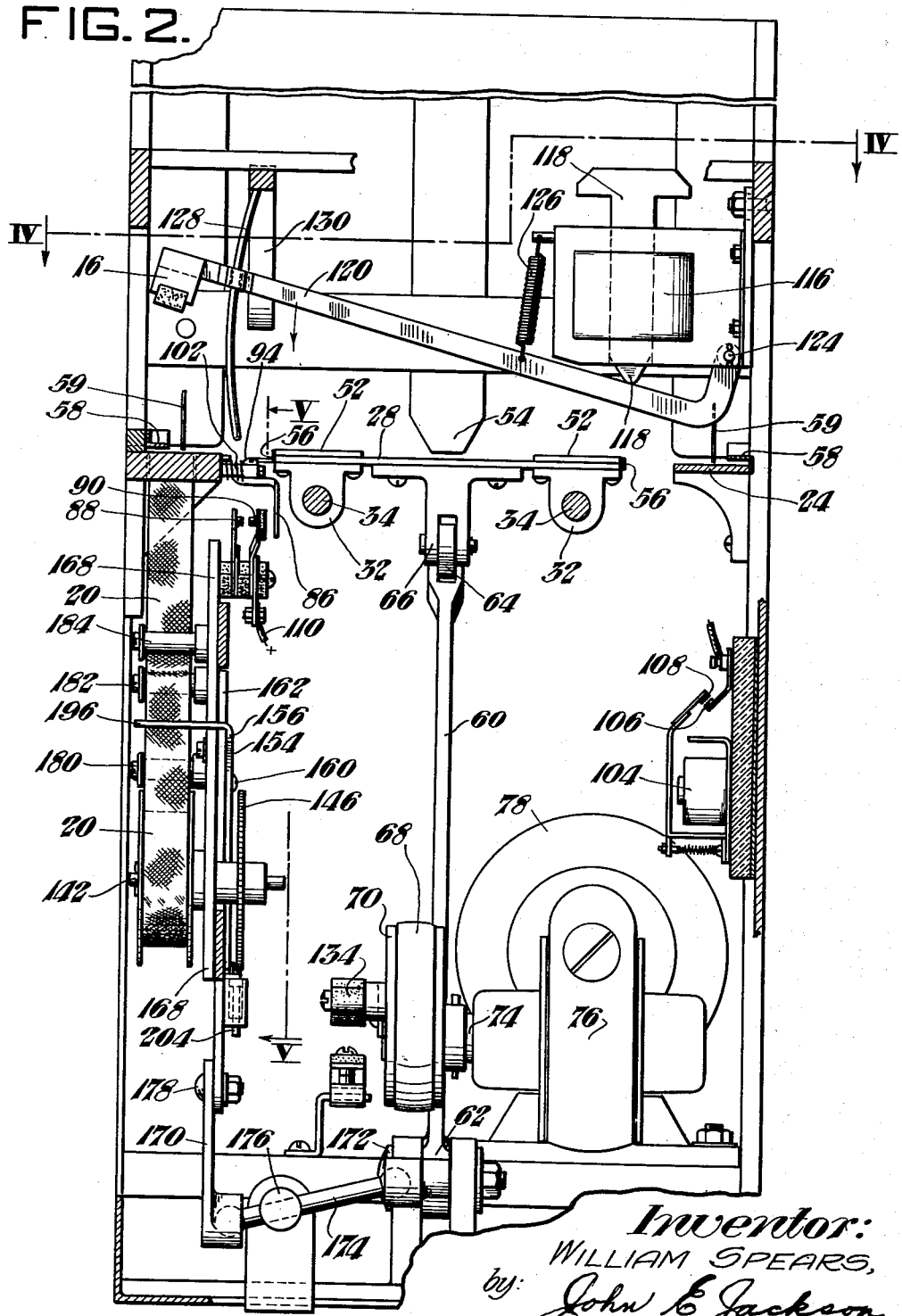

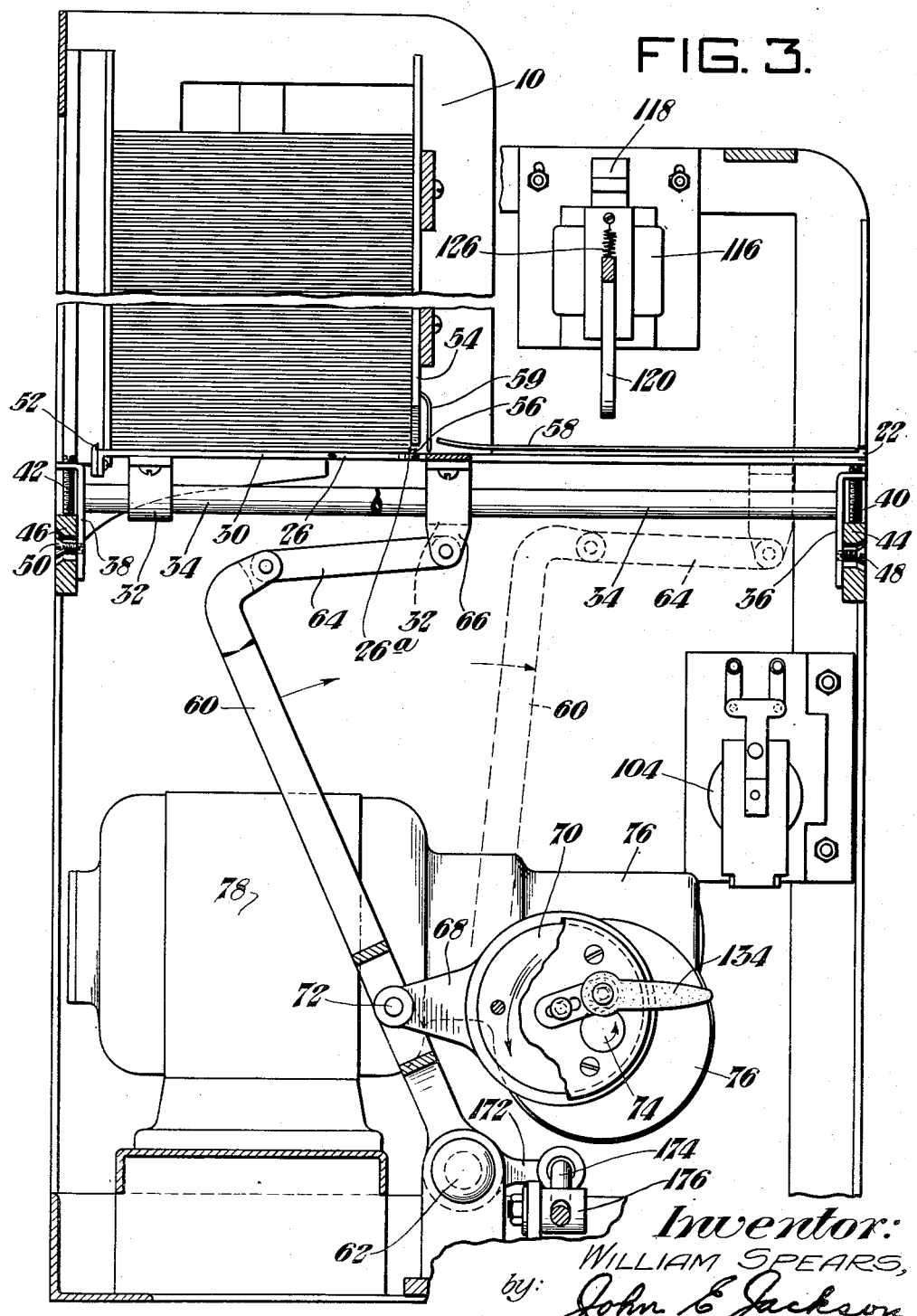

March 10, 1942.   W. SPEARS   2,276,111
CARD IDENTIFYING AND ISSUING MACHINE
Filed Jan. 28, 1939   6 Sheets-Sheet 4
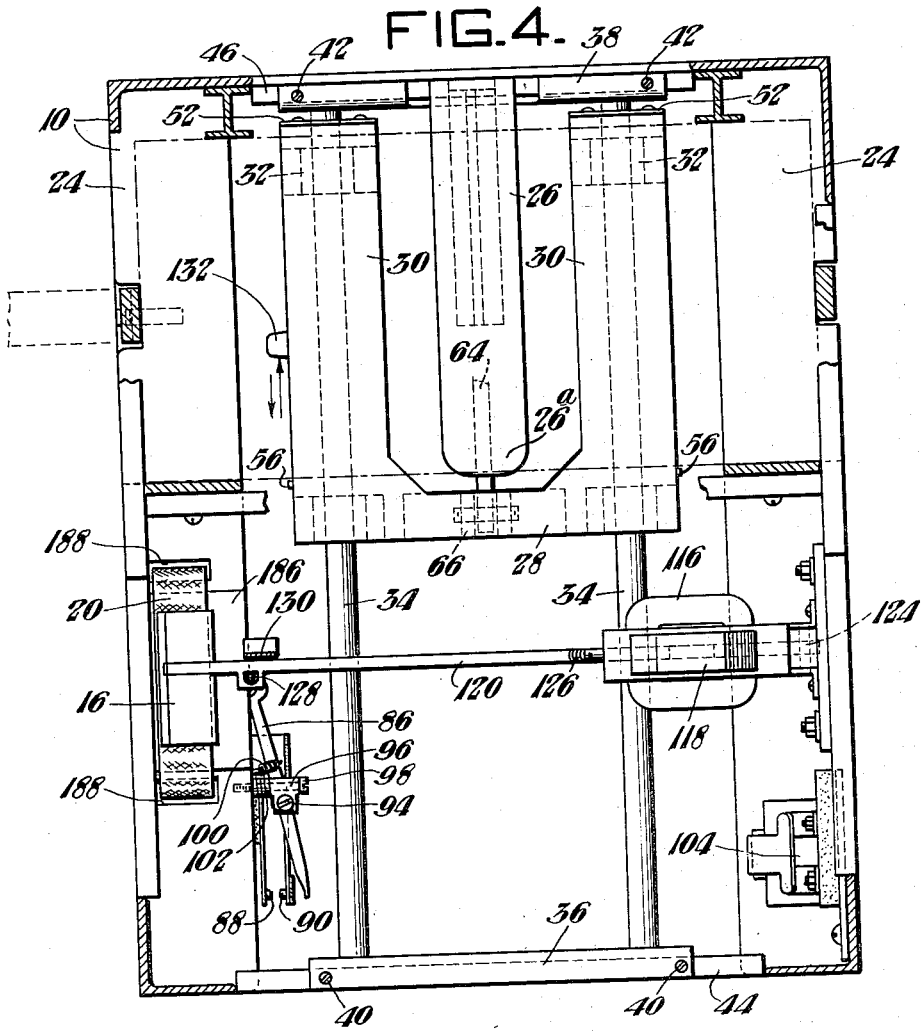
Inventor:
WILLIAM SPEARS,
by: John E. Jackson
his Attorney.

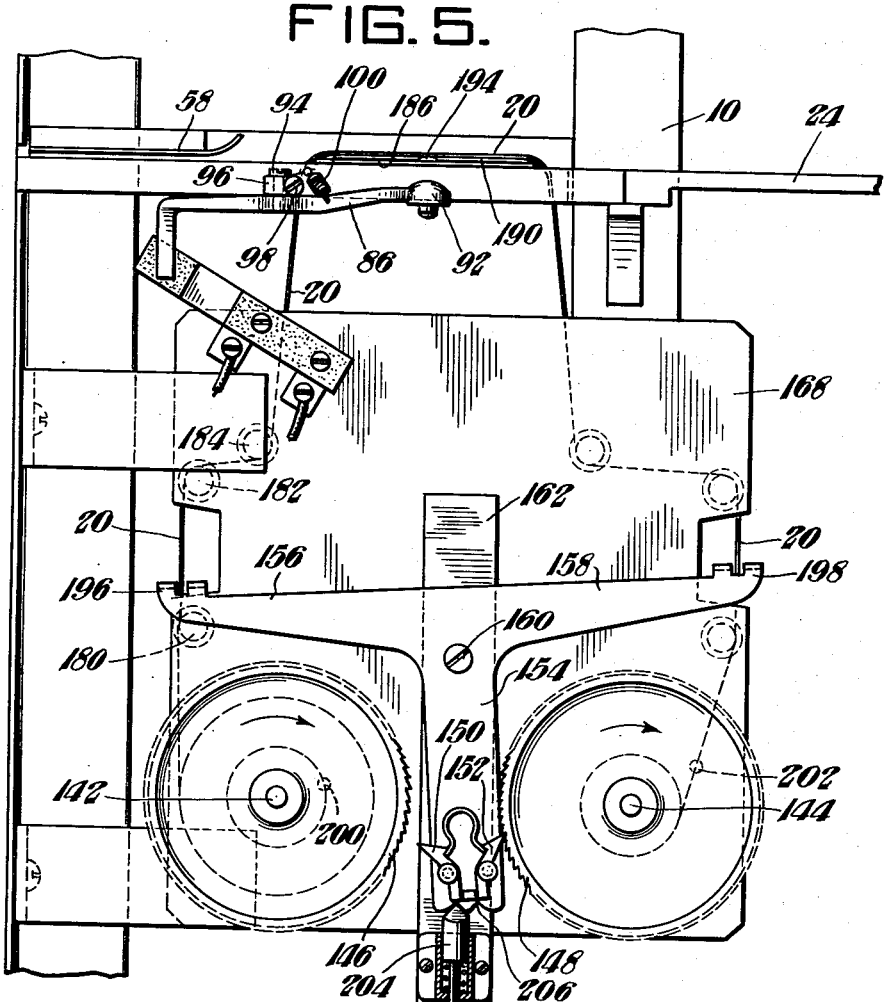
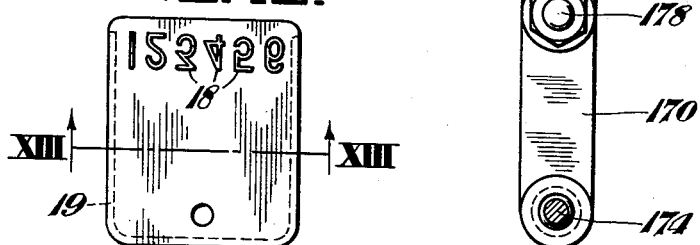

March 10, 1942. W. SPEARS 2,276,111
CARD IDENTIFYING AND ISSUING MACHINE
Filed Jan. 28, 1939 6 Sheets-Sheet 6
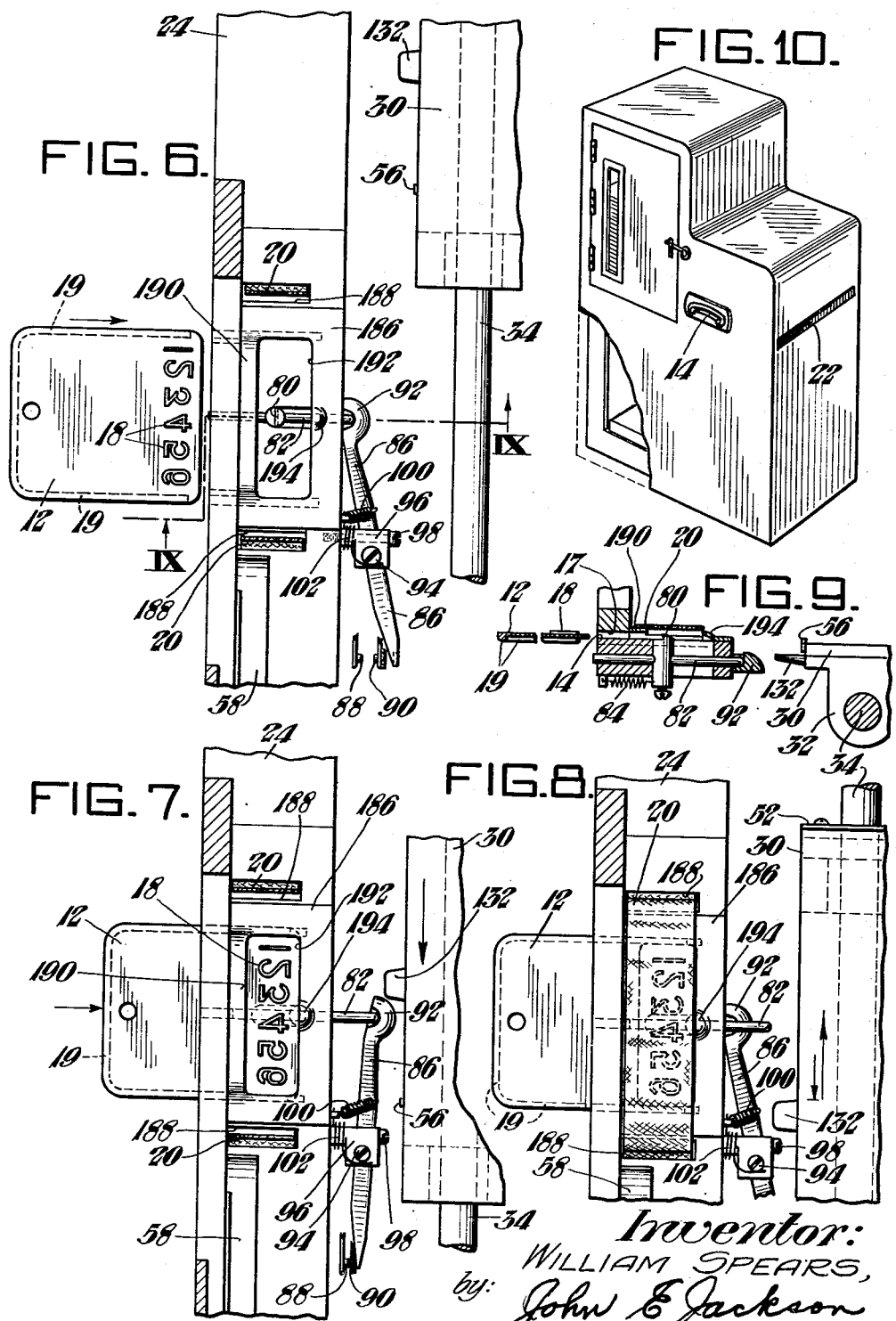
Inventor:
WILLIAM SPEARS,
by: John E Jackson
his Attorney.

Patented Mar. 10, 1942

2,276,111

UNITED STATES PATENT OFFICE 2,276,111

CARD IDENTIFYING AND ISSUING MACHINE

William Spears, Mount Lebanon, Pa.

Application January 28, 1939, Serial No. 253,456

5 Claims. (Cl. 101—69)

The present invention relates to badge operated means for successively feeding timecards to different workmen as they report to the usual station at the beginning of their days work or the beginning of a particular work period.

Heretofore in industrial establishments employing large numbers of workmen, it has been frequently the practice to have a time clerk or gateman hand each workman his timecard, various means being employed for identifying each employee. The workman then inserts his card in a time clock, which prints thereon the beginning time of his days work, work period or the beginning time of a particular job assigned to him.

The practice prior to the present invention required a gateman or timekeeper whose duty it was to select from a supply and hand to each workman a particular card identified with said workman. This was a time consuming and, therefore, a costly operation.

One object of the present invention is to provide automatic means for quickly issuing cards to each workman. Another object is to provide means operable by a badge carrying the workman's identification, which when inserted in the machine embodying the invention, will cause the printing of an identifying mark on the card, the automatic issuing of such card to the workman and the movement of another timecard to printing position. Each workman will have a badge carrying his identifying mark, and the cards can only be issued to workmen who insert such a badge in the machine.

The badge will preferably, but not necessarily, be of metal and of such a character that it will be impossible to insert it in the machine in other than the proper manner to cause the machine to automatically print the workman's identification on the card and issue the same.

In its broadest aspect the invention contemplates the provision of an automatic machine for successively issuing a timecard with an identification thereon each time an identifying element, such as a badge, is inserted in the machine. More particularly the invention embraces the particular elements hereinafter more fully described and the combination and coordination thereof in such a way that they singly or jointly contribute to the attainment of the single and joint functions hereinafter more fully set forth.

For a complete disclosure of the invention, reference is to be had to the accompanying drawings, the following detail description and the appended claims.

In the drawings, in which corresponding reference characters refer to corresponding parts in the several views:

Figure 1 is a side elevation of a machine embodying the invention with the casing removed and showing principally the card feeding means, the ribbon feed and related parts;

Figure 2 is a vertical section at right angles to Figure 1 taken approximately on the staggered line II—II of Figure 1;

Figure 3 is a vertical section taken in a plane substantially parallel to but beyond the plane of Figure 1;

Figure 4 is a horizontal section on line IV—IV of Figure 2 illustrating chiefly the card feed and printing mechanism, but omitting parts in lower planes;

Figure 5 is a detail taken on line V—V of Figure 2 illustrating principally the ribbon feed and a circuit closing trigger;

Figures 6, 7 and 8 are plan views illustrating successive positions of a badge operated circuit controlling trigger mechanism;

Figure 9 is a section on line IX—IX of Figure 6;

Figure 10 is a perspective view of the exterior of the machine;

Figure 11 is a diagram showing the circuits of certain parts of the electrical equipment of the machine; and Figures 12 and 13 are detail views of one form of badge which is peculiarly well suited for use in connection with the improved machine, Figure 12 being a plan and Figure 13 being a section on the corresponding numbered line of Figure 12.

Referring in detail to the drawings, the numeral 10 represents a magazine adapted to hold any desired quantity of cards, the capacity of the magazine being varied to suit the requirements of the particular establishment where the machine is to be installed. The machine illustrated may conveniently be made to hold one thousand (1,000) cards or more.

It is deemed important to have a certain cooperative relation between the badge and the machine whereby the operation is rendered both fool and tamper-proof so as to thus insure that the badge can only be inserted in a way in which it will properly coact with the mechanism so as to properly print the identifying indicia on the card. Where letters or figures are used for the purpose of identification, in order to have them printed legibly, it is important that the badge be inserted in a predetermined position.

In the embodiment of the invention illustrated, the badge is formed with depressed or intaglio "positive" numerals 18 on one face thereof forming corresponding embossed "negative" type face numerals on the opposite face. Preferably the badge is of metal and the depressed or intaglio "positive" characters are filled or coated with black enamel or other colored pigmented material to facilitate the reading thereof. The badge is of substantially rectangular form and has a shallow flange or bead 19 extending around three sides thereof, as shown in dotted lines in Figure 12, and the badge receiving mouth 14 of the machine is provided with depressions 15 to accommodate the flanges 19 and is also formed with an upwardly recessed portion 17 to allow clearance for the free passage of the embossed type face identifying indicia. As so arranged it will be apparent that the badge cannot be inserted either backwards, sidewise or in an inverted position. Moreover, the likelihood of the utilization of non-genuine or counterfeit badges will be practically impossible.

The machine is so constructed and arranged that each time a workman's badge 12 is inserted through the badge slot 14, a card which has been previously fed to printing position below a printing hammer 16, will have impressed or printed thereon the workman's identification mark. This identification mark, as illustrated at 18, is in the form of a workman's identifying number embossed from the metal of the badge forming the type faces, as above mentioned and as clearly shown in Figures 6 and 7. Thus when the badge is inserted under an ink ribbon 20, the badge number will be properly printed or impressed on the card above the ribbon and in this way will identify the card issued with the particular workman who inserted his badge in the machine. Immediately upon completion of the printing operation the card, bearing the workman's identifying number, will be ejected through the discharge orifice 22.

The deck or supply of cards within the magazine is supported at its ends on card supporting bars 24—24 and intermediate said ends on a tongue 26. Slidable below the deck or supply of cards there is a feed plate, indicated generally at 28, comprising spaced members 30—30 which carry respective depending lugs 32 which, in turn, are slidable on parallel guide rods 34—34. These rods are seated at their forward ends in a bar 36 and at their rearward ends in a bar 38. Adjustable levelling screws 40 and 42 are threaded through angular flanges formed on the top of the bars 36 and 38 respectively. The screws 40 bear on a front cross member 44 and, similarly, the screws 42 bear on a rear cross member 46. Once the position of the guide rods is properly established, the bars 36 and 38 are locked in position by means of screws 48 and 50 passing through suitable slots in the members 44 and 46 and engaging tapped holes in the bars 36 and 38. This construction and arrangement provides means whereby the feed plate 28 can be adjusted with precision in such a way that respective rear portions of the members 30—30 are elevated to a plane slightly above the plane of the supports 24—24, yet the front portion of the feed plate 28 will be either in the same plane of the supports 24—24 or slightly below that plane. Preferably the forward end 26ª of the tongue 26 will be positioned in a plane elevated slightly above that of the side card supporting bars 24.

This relative disposition of the elevations of the different parts of the cooperating card supporting and feeding mechanism is deemed important as it insures that only one card is fed forward at a time and thus prevents the cards from jamming the machine.

Secured to the rear of each of the spaced members 30—30 of the feed plate there is a feeding strip 52 preferably made of wear resistant metal, such as tungsten steel. The upper edge of each strip projects above the card contacting plane of the spaced members 30—30 a distance of a few thousandths of an inch less than the thickness of one of the cards to be fed. Because of the fact that the rear portions of the card feed plate are positioned at an elevation just slightly above the elevation of the card supporting bars 24, it is apparent that the weight of the deck of cards will exert more pressure on the spaced members 30—30 of the feed plate than upon the fixed card supporting side bars 24. As thus arranged, upon forward movement of the feed plate 28, the lowermost card in the deck will be moved forward and the card immediately above the lowermost card will be restrained from forward movement by a front abutment member 54, whose lower extremity clears the forward portion 26ª or the tongue 26 by an amount equal to the thickness of a card. Thus as the feed plate moves forward the lowermost card will be advanced toward printing position.

The feed plate near its forward end carries a pair of card feeding fingers 56 which, as a card is fed from the magazine, ejects the card which has just been printed upon. Guide strips 58 hold the cards against upward movement during their journey from the magazine to the discharge orifice 22.

As each card is fed forward from the magazine, it flexes outwardly the free ends of spring wire prongs 59—59 which are secured at their upper ends to the magazine frame. These prongs serve to prevent the backward movement of the card from printing position during the back stroke of the feed plate.

The card feed plate 28 is reciprocated by means of a lever 60 pivoted at 62 and having a link 64 connected with a bracket 66 depending from the under side of the feed plate 28. The actuating lever is oscillated by a pitman 68 actuated by an eccentric 70, the pitman being connected at 72 to the lever, as shown in Figure 3. The eccentric is mounted on a shaft 74 which is driven through suitable reduction gearing enclosed in the casing 76, which gearing, in turn, is driven by an electric motor 78.

The circuit of the motor 78 is automatically established in response to the insertion of a badge in the machine in a manner hereinafter fully set forth, and said circuit is interrupted automatically at the conclusion of the card feeding cycle.

Means to be presently described in detail are provided which insure the issuance of only one card each time a badge is inserted, regardless of how long the same may be held in the machine, although the intended mode of operation is that the workman shall insert and immediately withdraw his badge. However, should he attempt to foul the machine by holding the badge therein for a long period of time, he will be unable to secure more than one card at each insertion of the badge because of the special control means utilized.

As the workman inserts the badge 12 in the machine, the forward end thereof engages a tooth 80 secured to a sliding pin 82 (Figure 9). Upon inward movement of the badge, the tooth moves inwardly against the action of a spring 84, one end of which is secured to the lower end of the tooth and the other end of which is secured to a suitable anchorage pin, as shown in Figure 9. The inward movement of the pin 82 rocks a switch actuating trigger 86 from the position of Figure 6 to the position of Figure 7, thus closing a circuit of cross contacts 88 and 90. The trigger has a socketed portion formed in a head 92 at one free end thereof, which socketed portion is engaged by the inner extremity of the pin 82. This trigger is pivotally mounted at 94 to a bearing block 96 which in turn is pivotally mounted on a stud 98 secured to any suitable fixed part of the machine. As thus arranged the trigger can partake of oscillating movement in a substantially horizontal plane about the axis of the pivot 94 against the tension of a spring 100 and can also partake of oscillatory movement in a substantially vertical plane about the axis of the stud 98 against the restraining action of a torsion spring 102 which normally tends to hold the head 92 of the trigger in a plane in which it can be engaged by the badge operated pin 82.

When a workman inserts his badge, the pin 82 rocks the trigger to the position of Figure 7, thus closing the circuit across contacts 88 and 90 (Figures 6 and 11). This establishes a circuit from line L¹ to line L² through the coil of a relay 104. This relay is effective to close contacts 106 and 108, thus completing a circuit from line L¹ through wires 110 and 112 through the drive motor 78 and a printing solenoid 116 to the line L², the solenoid being connected in shunt with the motor, as shown.

The closing of the circuit through the solenoid 116 causes the armature core 118 thereof to rapidly rock the arm 120 of a printing hammer 16 about its pivotal support 124 against the restraining action of a spring 126 which is effective to retract the hammer after it has struck a blow upon the card. The hammer is effective, in cooperation with the embossed indicia on the badge and the printing ribbon, to impress or print the workman's identifying number of other mark on the card.

The parts are so constructed and arranged that immediately after the printing hammer effects such printing it is retracted to a position clear of the card so as to thus prevent smudging as the card moves outwardly to the discharge orifice. Suitable guide members 128 and 130 serve to guide the arm of the printing hammer in its movements. When the solenoid plunger 118 is at rest in its lowermost position, the printing hammer 16 carried by the arm 120 clears the previously printed card by about ¼ of an inch. The travel of the printing hammer beyond this lowermost position of the plunger 118, for the purpose of printing on the cards, is due to the momentum initially imparted to the hammer by the action of the solenoid plunger 118. After the printing impact, the hammer is retracted to its at-rest position by the spring 126.

Almost immediately after the trigger 86 has closed the circuit across contacts 88 and 90, the head 92 of the trigger is engaged by a lug 132 secured to and moving with the feed plate, whereupon the trigger is rocked about the axis of the stud 98, thus permitting the spring 100 to rock the trigger from the position of Figure 7 to the position of Figure 8, it being noted that at this time the head 92 of the trigger is below the pin 82, as shown in Figure 8, the pin being held inward against the action of the spring 84 by the inward pressure of the workman's hand against the badge. Thus the trigger is in such a position that when the badge is withdrawn, it will merely rock the block 94 about the horizontal axis of the pin 98 and thus be restored to the position of Figure 6 ready to be again actuated upon insertion of another badge. In short, as the card is ejected, the lug 132 on the feed plate conditions the trigger for immediate restoration to starting position upon withdrawal of the badge.

It will be understood that upon the closing of the circuit by the trigger to energize the relay 104, the circuit will be closed by the relay across contacts 106 and 108 for a sufficient time interval to permit the motor to turn the shaft 74 through one revolution. Approximately only 180 degrees of this revolution of the shaft 74 is utilized to effect the card feed. Thus there is available 180 degrees of the revolution shaft 74 to restore the card feeding parts to starting position. After the card has been printed and ejected, and while the feed plate is moving back to starting position, a cam finger 134 adjustably secured to the eccentric 70 or to any member rotating with the shaft 74 strikes the arm 136 of a limit switch, breaks the circuit across the contacts 138 and 140 thereof, thus breaking the motor circuit and de-energizing the solenoid, whereupon, due to the momentum of the parts or the coasting of the motor, the card feed plate is restored to the starting position of Figure 3, where it is again ready to have the described cycle repeated upon insertion of the badge by the next workmen. The contour of the cam finger 134 will be so plotted as to hold the contacts 138 and 140 separate for a sufficient length of time to permit the operating parts to be restored to proper starting position and thus be in readiness for the next cycle of operation upon insertion of the next badge.

During the printing operation described, the badge 12 was below the ribbon 20 and the card was positioned above it so that upon the down-stroke of the printing hammer arm, the embossed indicia, such as a number, letter or the like, is printed on the card before it is fed from the machine. When the card is fed out, it projects for a distance about one-half of its width beyond the front face of the casing and the workman merely picks it from the machine.

Preferably means are provided for feeding the ink ribbon intermittently so that for each printing impression a fresh portion of the inking ribbon is brought into printing position. This ribbon feed mechanism, as best shown in Figures 1 and 5, includes a pair of suitable reels mounted on shafts 142 and 144 which carry respective feed ratchet wheels 146 and 148 adapted to be actuated by respective teeth 150 and 152 of a feed pawl pivotally mounted on an arm 154 of a double bell crank having upper arms 156 and 158. This double bell crank is pivoted on a stud 160 carried by a vertically movable slide 162, which is guided by pins 164—164 passing through guide slots 166—166 and secured to a fixed frame plate 168. The slide 162 is connected at its lower end with a link 170 which is adapted to transmit motion from an arm 172 projecting outwardly from the lever 60 hereinabove referred to. This arm 172, when rocked, transmits movement to the link 170 by means of a rocker bar 174 pivoted at 176. The ends of this rocker bar 174 have respective ball and socket connections with said link 170 and said arm 172 in order to compensate for the angularity of motion. The connection 178 between the lower end of the slide and the upper end of the link 170 have sufficient clearance or play to compensate for the angular movement of the rocker member relative to the vertically movable slide.

The ink ribbon 20 in the condition illustrated passes from the left reel in Figure 5 over guides 180 and 182 under guide 184 and thence over the platen 186, there being suitable slots 188—188 in the platen for the free passage of the ribbon. The ribbon then passes over a throat plate 190 which has an aperture 192 formed therein of sufficient size to permit the embossed indicia on the badge to be positioned for proper printing coaction with the ribbon and the card. This throat plate 192 has an upwardly deformed portion 194 therein which accommodates the upper extremity of the tooth 80 when the badge has been inserted into printing position. There is a corresponding receess formed in the printing hammer so that no printing action will be effected by the presence of such embossment in the event that the ribbon should inadvertently be positioned over the same.

The ribbon is intermittently fed from one reel to the other and means are provided whereby when the supply of ribbon on one reel is approximately exhausted the feeding mechanism will shift so as to reverse the ribbon movement and thus pay off ribbon from the reel on which the supply has accmumulated. To accomplish this, the ribbon is fed through forked portions 196 and 198 on the extremities of the arms 156 and 158 and respective buttons 200 and 202 are secured to the ribbon at such positions that when a given reel is approximately depleted of its supply of ribbon, the button, which is incapable of passing through the forked end, rocks the double bell crank 158 and thus shifts the arm 154 into position so that the appropriate pawl tooth is brought into position for proper cooperation with the proper ribbon wheel ratchet. As illustrated in Figure 5, the upward movement of the slide 162 is effective to turn the ratchet and the ribbon reel on the shaft 144 in a clockwise direction, as indicated by the arrow. This will, of course, accumulate ribbon on the reel on shaft 144 and pay off ribbon from the reel on shaft 142. When sufficient ribbon has been paid off from the reel on the shaft 142 to practically deplete its supply, the button 200 on the ribbon of the reel on the shaft 142 will come into contact with the forked portion 196 of the arm 156, thereby rocking the arm so as to bring the pawl tooth 150 into position for coaction with the ratchet 146. Thereupon upward movement of the slide 162 will turn the ribbon reels counter-clockwise.

A spring pressed impositive locking dog 204 is provided with a pointed end for coaction with suitable notches 206 formed in the free end of the arm 154 so as to hold the same in its respective alternate positions for engagement with the ratchets 146 and 148.

Although in the preferred embodiment of the invention described an ink ribbon is used for recording indicia corresponding to that on the badge, it is to be understood that inasmuch as the numbers or other identifying indicia on the badge are embossed or stand out in relief, a hammer blow of sufficient force could be imparted to the card so as to emboss the indicia on the card, thus making it unnecessary to provide a printing ribbon. It is also within my invention to employ identifying indicia on the badge in the form of pointed projections or punch-like pins which would be effective to perforate the indicia card upon being struck by the hammer.

While I have described quite specifically the invention herein illustrated, the drawings and description are to be interpreted in an illustrative rather than a limiting sense and the appended claims are to be construed as broadly as is consistent with the prior art.

I claim:

1. In a machine of the character described, means for guiding a printing badge to a printing station, impression mechanism located at said station, electrically powered means for actuating said impression mechanism, a badge actuated trigger, a switch operable by the trigger for initiating the operation of said impression mechanism, and means for moving said trigger out of operative relation with the badge.

2. In a machine of the character described, means for guiding a printing badge to a printing station, impression mechanism located at said station, electrically powered means for actuating said impression mechanism, a badge actuated trigger, a switch operable by the trigger, means for mounting said trigger for pivotal movement about respective horizontal and vertical axes, and means for moving the trigger about its horizontal axis so as to move it out of operative relation with the badge.

3. In a machine of the character described, a magazine carrying a supply of cards, means for guiding a printing badge to a printing station, impression mechanism located at said station, a feed member for advancing a card from the magazine to the printing station, electromagnetic means for actuating said impression mechanism, electrically powered means for actuating said feed member, a badge actuated trigger, a switch operable by the trigger for initiating the operation of said impression mechanism, a relay controlled by said switch effective to sustain a power circuit through said electromagnetic means and through said electrically powered means, means on said feed member for moving the trigger out of operative relation with the badge, and a limit switch for breaking said sustained power circuit upon completion of the printing, thus restoring the apparatus to condition for repetition of the operating cycle substantially as described.

4. In a machine of the character described, a magazine carrying a supply of cards, means for guiding a printing badge to a printing station, impression mechanism located at said station, a feed member for advancing a card from the magazine to the impression station, electromagnetic means for actuating said impression mechanism, electrically powered means for actuating said feed member, a badge actuated trigger, a switch closed thereby upon insertion of the badge to printing position, a relay having a coil whose circuit is controlled by said switch, a power circuit including a circuit making and breaking element actuated by said relay coil, said power circuit including said electromagnetic means and said electrically powered means, means on said feed member for tripping said trigger to open said switch, and means for automatically opening the power circuit, thus restoring the apparatus to condition for repetition of the operating cycle substantially as described.

5. In a machine of the character described, a magazine carrying a supply of cards, a member for feeding cards from the magazine, means for guiding a printing badge to a printing station, an impression hammer at said station, electromagnetic means for powering said hammer, a badge receiving guide at said station, a badge operated element in juxtaposition thereto, a trigger mounted for movement about respective horizontal and vertical axes, said badge operated element being effective to rock the trigger about said vertical axis, a switch arranged to be closed by said trigger upon the inward movement of said element by the badge, means on said feeding member for rocking the trigger about said horizontal axis to disengage it from said element, yielding means for moving the trigger to a position to open said switch upon such disengagement, and yielding means for restoring the trigger to starting position upon removal of the badge from said guide.

WILLIAM SPEARS.